United States Patent
Ohta et al.

(10) Patent No.: US 6,196,941 B1
(45) Date of Patent: Mar. 6, 2001

(54) AUTO TENSIONER

(75) Inventors: Hideyuki Ohta, Osaka; Tadasu Yamakawa, Nara, both of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/151,207

(22) Filed: Sep. 11, 1998

(30) Foreign Application Priority Data

Sep. 24, 1997 (JP) .................................... 9-258298
Sep. 24, 1997 (JP) .................................... 9-258299

(51) Int. Cl.[7] ............................... F16H 7/12; F16H 7/08
(52) U.S. Cl. .......................................... 474/135; 474/109
(58) Field of Search ................................... 474/135, 133, 474/101, 113, 109, 96, 114–117, 138, 902

(56) References Cited

U.S. PATENT DOCUMENTS

| | | | |
|---|---|---|---|
| 4,698,049 | * 10/1987 | Bytzek et al. | 474/135 |
| 5,033,423 | * 7/1991 | Diard | 474/133 X |
| 5,334,109 | * 8/1994 | Izutsu et al. | 474/135 |
| 5,449,328 | 9/1995 | Schmidt et al. . | |
| 5,478,285 | * 12/1995 | Bakker et al. | 474/135 |
| 5,803,849 | * 9/1998 | Ayukawa | 474/94 |
| 6,004,235 | * 12/1999 | Ohta et al. | 474/133 X |

FOREIGN PATENT DOCUMENTS

652390 * 5/1995 (EP) .

* cited by examiner

*Primary Examiner*—David A. Bucci
*Assistant Examiner*—Marcus Charles
(74) *Attorney, Agent, or Firm*—Jacobson, Price, Holman & Stern, PLLC

(57) ABSTRACT

An auto tensioner comprises a fixing shaft having an arm supporting portion, an arm supported around the arm supporting portion of the fixing shaft so as to be swingable, for keeping the belt tension constant, a tension pulley supported rotatably at a free end of the arm, a friction pressing plate disposed so as to oppose the arm and blocked from rotating relative to the arm supporting portion, a friction plate disposed between the arm and the friction pressing plate so as to supply the arm with a swing resistance, and a twisting coil spring for pressing the arm against the friction plate so as to make the friction plate in contact with the friction pressing plate, wherein the friction pressing plate has a plurality of concave portions for collecting wearing particles generated because of a friction between the friction plate and friction pressing plate and wearing particles are collected in the concave portions so as to prevent the wearing particles from staying between the friction plate and friction pressing plate.

11 Claims, 15 Drawing Sheets

F I G. 2
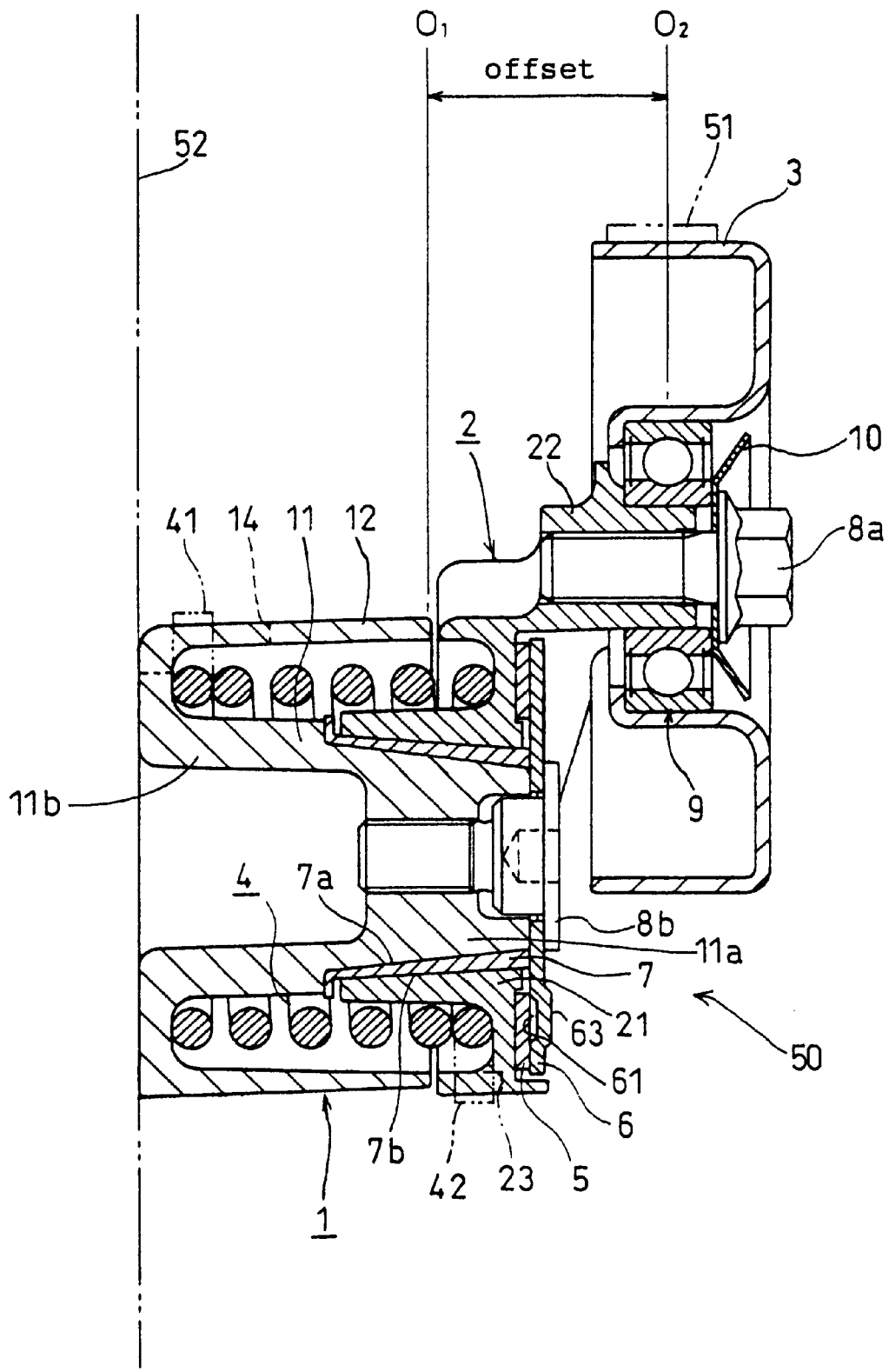

F I G. 7
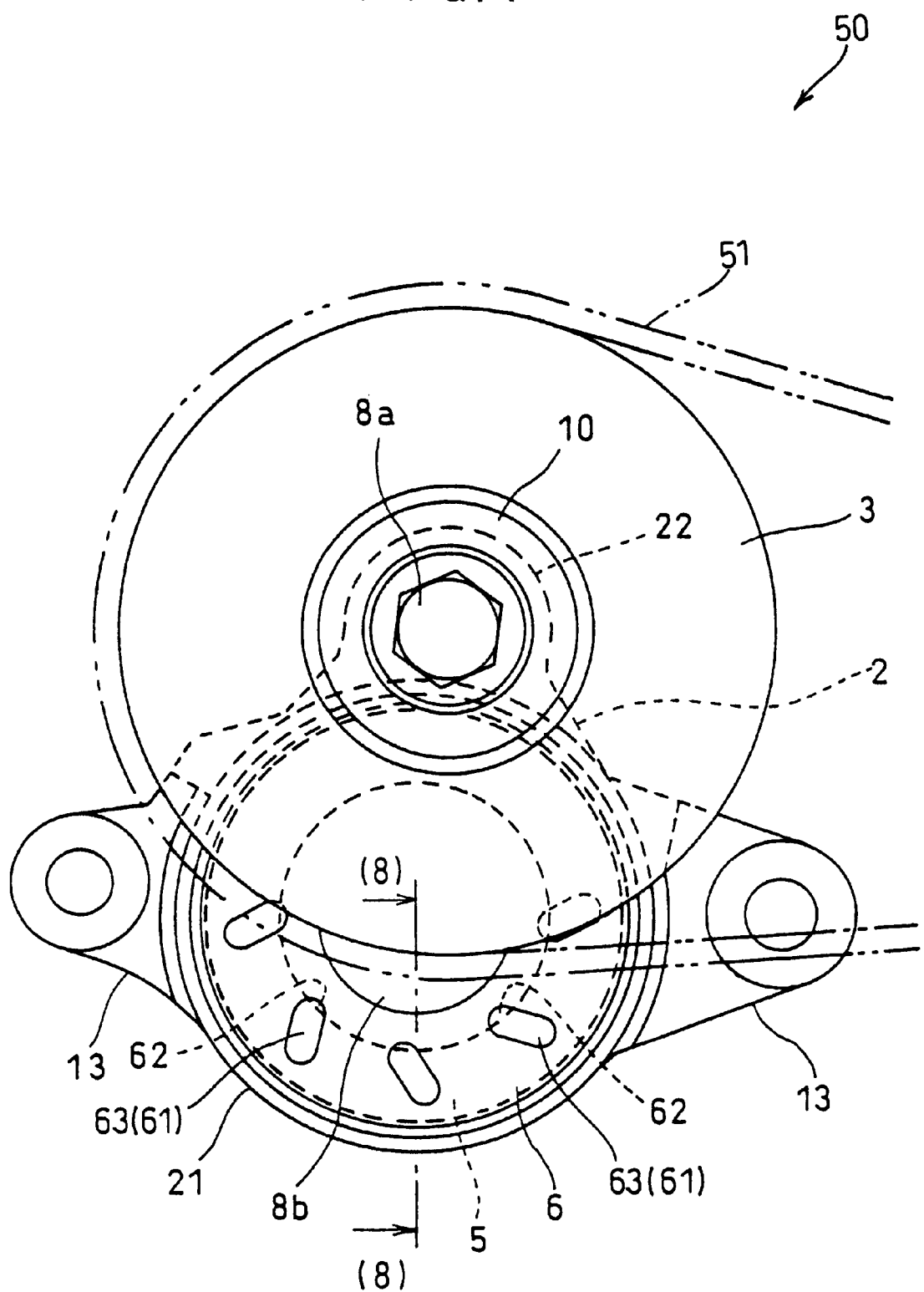

AUTO TENSIONER

BACKGROUND OF THE INVENTION

1. Field of the Invention

This invention relates to an auto tensioner for automatically holding a belt tension at an appropriate strength in a belt driving mechanism, and more particularly to an auto tensioner for suppressing a change of the position of a tension pulley due to a vibration or impact received from a belt as well as allowing a pressing work of the tension pulley so as to keep the belt tension constant.

2. Description of the Related Art

Some type of the auto tensioner comprises a tension pulley on which a belt is to be wound, an arm for supporting the tension pulley such that it is capable of rotating, a fixing shaft for supporting this arm swingably, a friction plate for supplying a swing resistance to this arm, and a twisting coil spring for urging the arm in the direction of a rotation thereof as well as pressing the arm against the friction plate. The twisting coil spring and the friction plate exert different functions between when the belt tension changes mildly and when a violent vibration or impact is applied thereto.

First, if the belt tension changes mildly, the arm is inclined by the twisting restoration force of the twisting coil spring, so as to keep the belt tension constant. If a violent vibration or impact is applied from the belt to the tension pulley, that vibration or impact is transmitted to the arm, however because the arm is pressed against a friction plate by the expansive restoration force of the twisting coil spring, a large friction resistance is generated between the arm and the friction plate. As a result, the vibration or impact is absorbed and damped quickly, thereby preventing the swing of the arm supporting the tension pulley so as to keep the belt tension constant.

In the above auto tensioner, the friction plate is worn with a passage of time. Then, wearing particles are generated by this wearing. Some part of the wearing particles remain in a gap between the friction plate and a mating member which the friction plate contacts. If the remainder of the wearing particles increases, the friction resistance between the friction plate and the arm changes. Consequently, the damping function for the vibration or impact may drop. As a result, there is a possibility that a function of the auto tensioner for protecting the arm supporting the tension pulley from the aforementioned vibration or impact so as to keep the belt tension constant may be lost.

SUMMARY OF THE INVENTION

Accordingly, a primary object of the present invention is to provide an auto tensioner capable of suppressing changes of friction resistance of a friction plate accompanied by a generation of wearing particles.

Another object of the present invention is to provide an auto tensioner capable of suppressing changes of friction resistance of a friction plate accompanied by a generation of wearing particles and protecting an arm supporting a tension pulley from a vibration or impact so as to keep the belt tension constant.

The other objects, features and advantage of the present invention will be evident from a following description.

To achieve the above object, the present invention provides an auto tensioner comprising a fixing shaft having an arm supporting portion, an arm supported around the arm supporting portion of the fixing shaft so as to be swingable, a tension pulley supported rotatably at a free end of the arm, an opposing member disposed so as to oppose the arm and blocked from rotating relative to the arm supporting portion, a friction plate disposed between the arm and the opposing member so as to supply the arm with a swing resistance due to a friction resistance generated by a contact thereof with the opposing member, and a pressing member for pressing the arm against the friction plate so as to make the friction plate in contact with the opposing member, wherein at least one of said arm and said opposing member has a wearing particles collecting portion for collecting wearing particles generated in a portion contacting the friction plate because of a friction with the friction plate.

Preferably, the wearing particles collecting portion is composed of a concave portion formed in a plane in which at least one of the arm supporting portion and the opposing member is in contact with the friction plate.

Preferably, the opposing member is a friction pressing plate for pressing the friction plate against the arm.

Preferably, the pressing member is a twisting coil spring for pressing the arm against the friction plate and urging the arm in a direction of a rotation thereof.

Preferably, a plurality of the wearing particles collecting portions are spaced along the circumference.

Preferably, a wearing particles discharging portion for discharging wearing particles collected in the wearing particles collecting portion to outside is further contained.

Preferably, a wearing particles discharging portion for discharging wearing particles collected in the wearing particles collecting portion to outside is further contained, and the wearing particles discharging portion is an opening formed by extending an inner end in the diameter direction of the concave portion inward in the diameter direction beyond an inner end in the diameter direction of the friction plate.

Preferably, a wearing particles discharging portion for discharging wearing particles collected in the wearing particles collecting portion to outside is further contained, and the wearing particles discharging portion is an opening formed by extending an outer end in the diameter direction of the concave portion outward in the diameter direction beyond an outer end in the diameter direction of the friction plate.

Preferably, the wearing particles collecting portion is composed of a belt-like groove formed in the diameter direction.

Preferably, the wearing particles collecting portion is composed of a belt-like groove inclined relative to the diameter direction.

Preferably, the wearing particles collecting portion is composed of a V-shaped groove.

Preferably, a bushing interposed between an outer surface of the arm supporting portion of the fixing shaft and an inner surface of the arm mounted on the arm supporting portion is further contained, and with respect to a center in the axial direction of the arm supporting portion of the fixing shaft, a center in the axial direction of a pulley supporting portion which is a free end of the arm is offset and the tension pulley is rotatably supported by the pulley supporting portion of the arm, the bushing has a thickness which increases gradually from a proximal end of the arm supporting portion to a distal end thereof.

In the auto tensioner of the present invention, because the wearing particles generated by wearing with a passage of time are collected in the wearing particles collecting portion and the wearing particles are discharged from a gap between the friction plate and a mating plate which the friction plate contacts so that they are unlikely to remain therein, the friction resistance of the friction plate is hard to change.

If the wearing particles collecting portions are provided at plural positions spaced along the circumference, the wearing particles generated from the friction plate can be collected there over a wide range. As a result, as compared to a case of a wearing particles collecting portion provided, the discharge amount of the wearing particles is sufficient and the wearing particles from a wide range of the friction plate can be discharged.

If the wearing particles discharging portion opening to outside is provided at the wearing particles collecting portion, the wearing particles collected therein is successively discharged from the wearing particles collecting portion to outside. As a result, the wearing particles in the wearing particles collecting portion is prevented from returning to a gap between the friction plate and a mating plate which the friction plate contacts.

If the wearing particles collecting portion is a belt-like groove extending in the diameter direction, the wearing particles collecting portion is perpendicular to the rotation direction of the arm relative to the friction plate and rotation direction of the friction plate relative to an annular plate, the wearing particles are easier to collect in the wearing particles collecting portion.

If the wearing particles collecting portion is a belt-like groove inclined relative to the diameter direction, the wearing particles in the wearing particles collecting portion is taken to one side in the diameter direction by the swing of the arm.

If the wearing particles collecting portion is a V-shaped groove, the wearing particles are easier to collect in the wearing particles collecting portion because of the swing of the arm or a rotation thereof in both ways.

If the bushing has a structure of thickness which increases gradually from the proximal end of the arm supporting portion to the distal end thereof, even if a large load induced by the moment applied to the tension pulley due to offset is concentrated on a particular position of the bushing, the bushing can be provided with a sufficient load resistance and wear resistance against that load. Consequently, a generation of eccentric wearing, crack or fracture in the bushing is prevented.

BRIEF DESCRIPTION OF THE DRAWINGS

These and other objects as well as advantages of the invention will become clear by the following description of preferred embodiments of the invention with reference to the accompanying drawings, wherein:

FIG. 2 is a sectional view taken along the line (2)—(2) of FIG. 1;

FIG. 7 is a plan view of an auto tensioner according to a third preferred embodiment of the present invention;

In all these figures, like components are indicated by the same numerals.

DETAILED DESCRIPTION OF THE PREFERRED EMBODIMENTS

Figure 1:
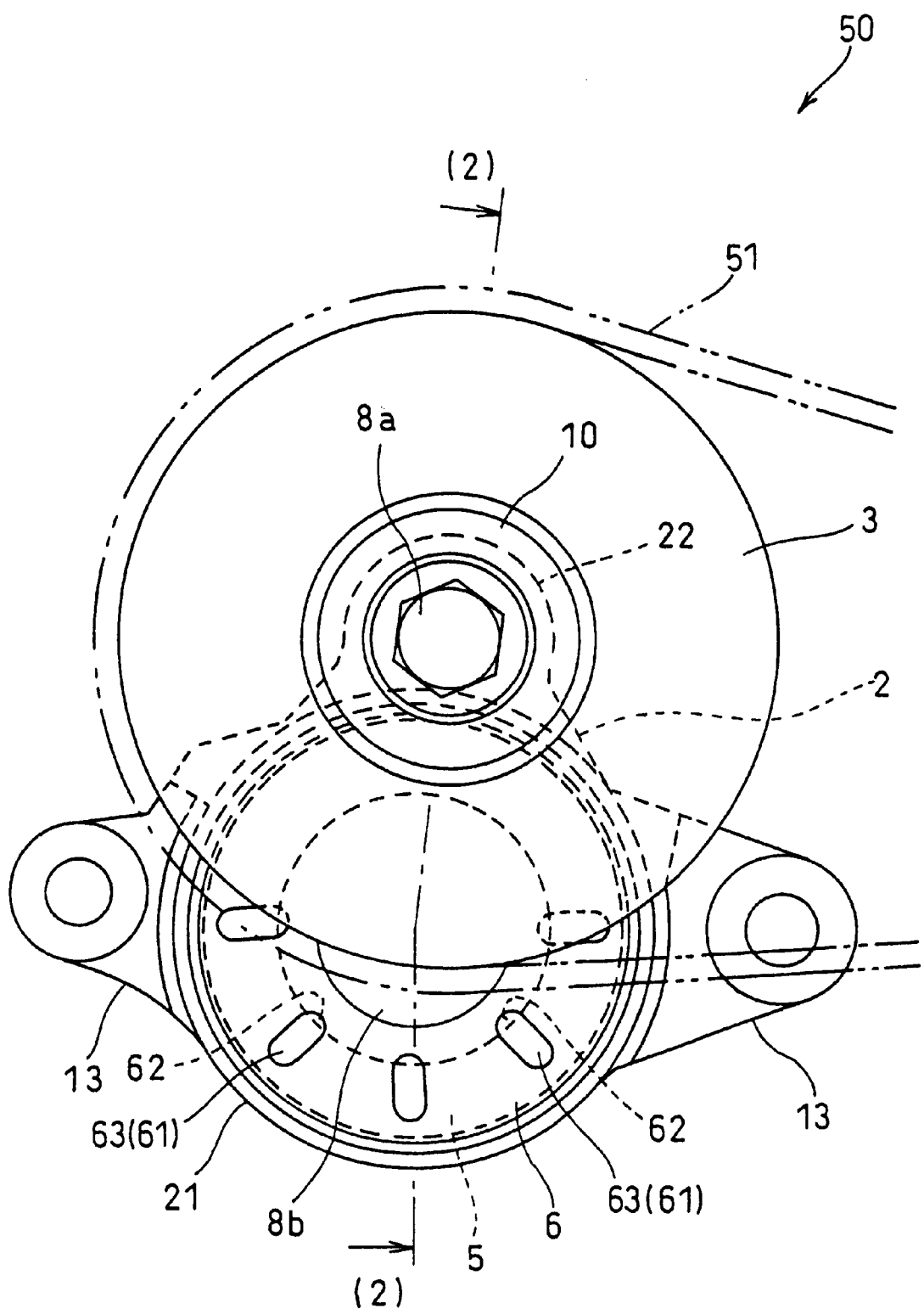
FIG. 1 is a plan view of an auto tensioner according to a first preferred embodiment of the present invention.

An auto tensioner according to a first preferred embodiment of the present invention will be described with reference to FIGS. 1–4.

An auto tensioner 50 comprises a fixing shaft 1, an arm 2, a tension pulley 3, a twisting coil spring 4 acting as a pressing member, a friction plate 5, a friction pressing plate 6 acting as a mating member, and a bushing 7 acting as a slide bearing. A belt 51 is wound around the tension pulley 3.

In the auto tensioner 50, the tension pulley 3 is disposed at an offset position protruding forward from an end of the fixing shaft 1. In other words, the fixing shaft 1 has an arm supporting portion 11 and with respect to a center $O_1$ in the axial direction of the arm supporting portion 11, a center $O_2$ in the axial direction of the pulley supporting portion 22 of the tension pulley 3 is offset.

The fixing shaft 1 is fixed to an mounting object 52 in which a belt driving mechanism (not shown) is to be installed. The fixing shaft 1 comprises an arm supporting portion 11 constituted of a frustum shaped end half portion 11a and a cylindrical proximal half portion 11b, a cover portion 12 extending outward in the diameter direction from the proximal side of the arm supporting portion 11 for surrounding an outer periphery of the arm supporting portion 11 and bolt fixing pieces 13 formed at the positions of the center $O_1$ in the axial direction on an outer periphery of the cover portion 12 so that they project in both ways in the diameter direction. The fixing shaft 1 is produced by die casting using aluminum. An outer peripheral surface of the frustum shaped end half portion 11a of the arm supporting portion 11 of the fixing shaft 1 corresponds to a draft angle of a forming die.

The arm 2 is journaled by an arm supporting portion 11 of the fixing shaft 1 so as to be swingable. The arm 2 comprises a boss portion 21 mounted on the end half portion 11a of the arm supporting portion 11 via a frustum shaped bushing 7, and a pulley supporting portion 22 provided integrally and continuously with this boss portion 21 so as to protrude in a direction opposite to the protrusion of the boss portion 21.

The tension pulley 3 is rotatably supported by the pulley supporting portion 22 of the arm 2 via a ball bearing 9 and a belt 51 is wound around an outer periphery thereof. The tension pulley 3 is produced of press material. The tension pulley 3 is installed on the pulley supporting portion 22 of the arm 2 via a bolt 8a. To protect the ball bearing 9 from water and foreign matter, a bearing protecting cover 10 is mounted by the bolt 8a.

The twisting coil spring 4 is disposed in an annular space between outer peripheries of the arm supporting portion 11 of the fixing shaft 1 and the boss portion 21 of the arm 2 and an inner periphery of the cover portion 12 of the fixing shaft 1 in a condition that it is not in contact with each of their surfaces and compressed by twisting. The twisting coil spring 4 urges the arm 2 in a direction (counterclockwise direction in FIG. 1) of the swing directions by a urging force (twisting restoration force) in the direction of the periphery, so as to supply the belt 51 with a tension via the tension pulley 3 journals by the arm 2. Further, the twisting coil spring 4 presses the boss portion 21 of the arm 2 against the friction plate 5 by an urging force (expansive restoration force) in the axial direction so as to supply the boss portion 21 with a wear resistance.

Both end portions of the twisting coil spring 4 have engaging portions 41, 42 bent outward in the diameter direction such that they are integral with the twisting coil spring 4. These engaging portions 41, 42 are fit to a slit-shaped cutout 14 provided on a bottom of the fixing shaft 1 and a slit-shaped cutout 23 provided on the boss portion 21 of the arm 2 respectively.

The friction plate 5 supplies the boss portion 21 of the arm 2 with a friction resistance so as to supply the arm 2 with a swing resistance. The friction plate 5 opposes the boss portion 21 of the arm 2 so as to be in contact therewith in the axial direction. The friction pressing plate 6 is in contact with an end face of the end half portion 11a of the arm supporting portion 11 of the fixing shaft 1. Further, the friction pressing plate 6 is fixed to the arm supporting portion 11 by tightening the bolt 8b bolted to the end half portion 11a of the arm supporting portion 11. Then, the boss portion 21 of the arm 2 is urged toward the friction pressing plate 6 by the expansive restoration force of the twisting coil spring 4. The friction plate 5 is elastically nipped between the boss portion 21 and the friction pressing plate 6 by this urging force so as to exert the friction resistance against the swing of the arm 2.

Figure 4:
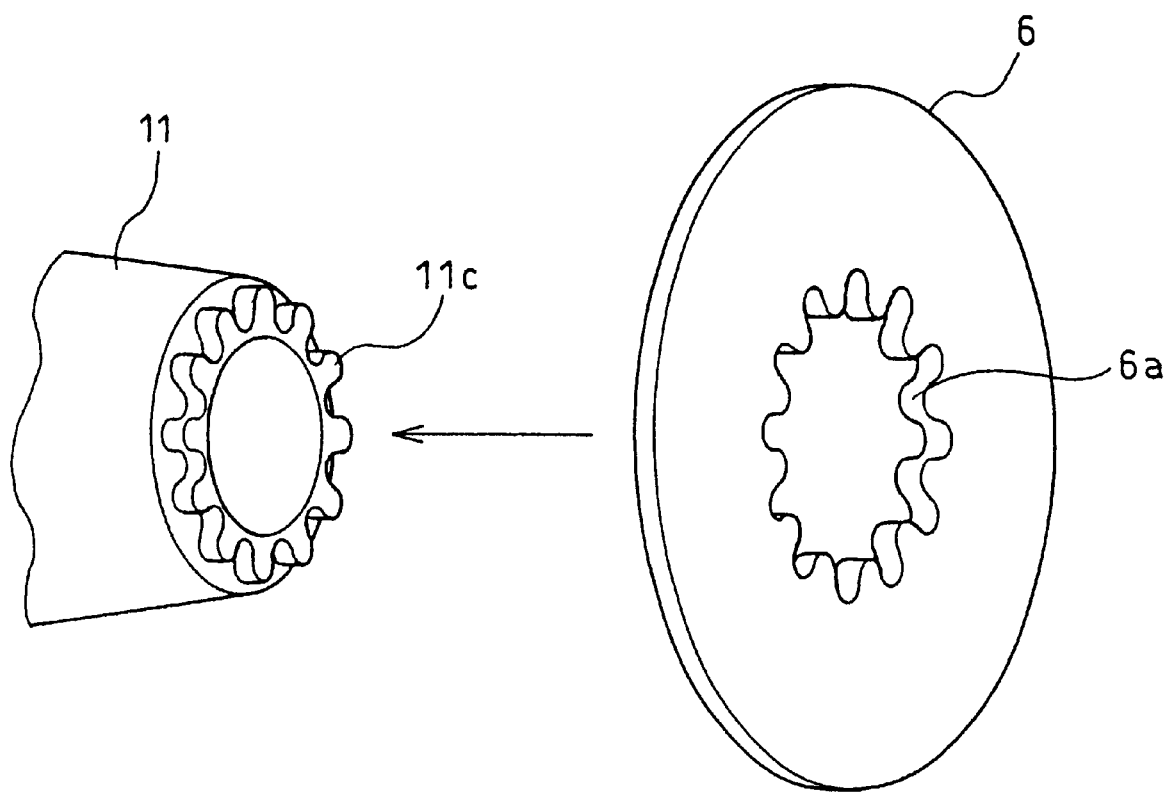
FIG. 4 is a perspective view showing a coupling portion of an arm supporting portion and a friction pressing plate according to the first embodiment.

As shown in FIG. 4, the friction pressing plate 6 is formed of an annular plate and has wave-shaped engaging portions 6a provided on an inner periphery thereof. An end portion of the arm supporting portion 11 of the fixing shaft 1 also has wave-shaped engaging portions 11c of the same shape as the wave-shaped engaging portions 6a. The friction pressing plate 6 is fixed to the arm supporting portion 11 such that both the wave-shaped engaging portions 6a and 11c are engaged with each other.

Figure 3:
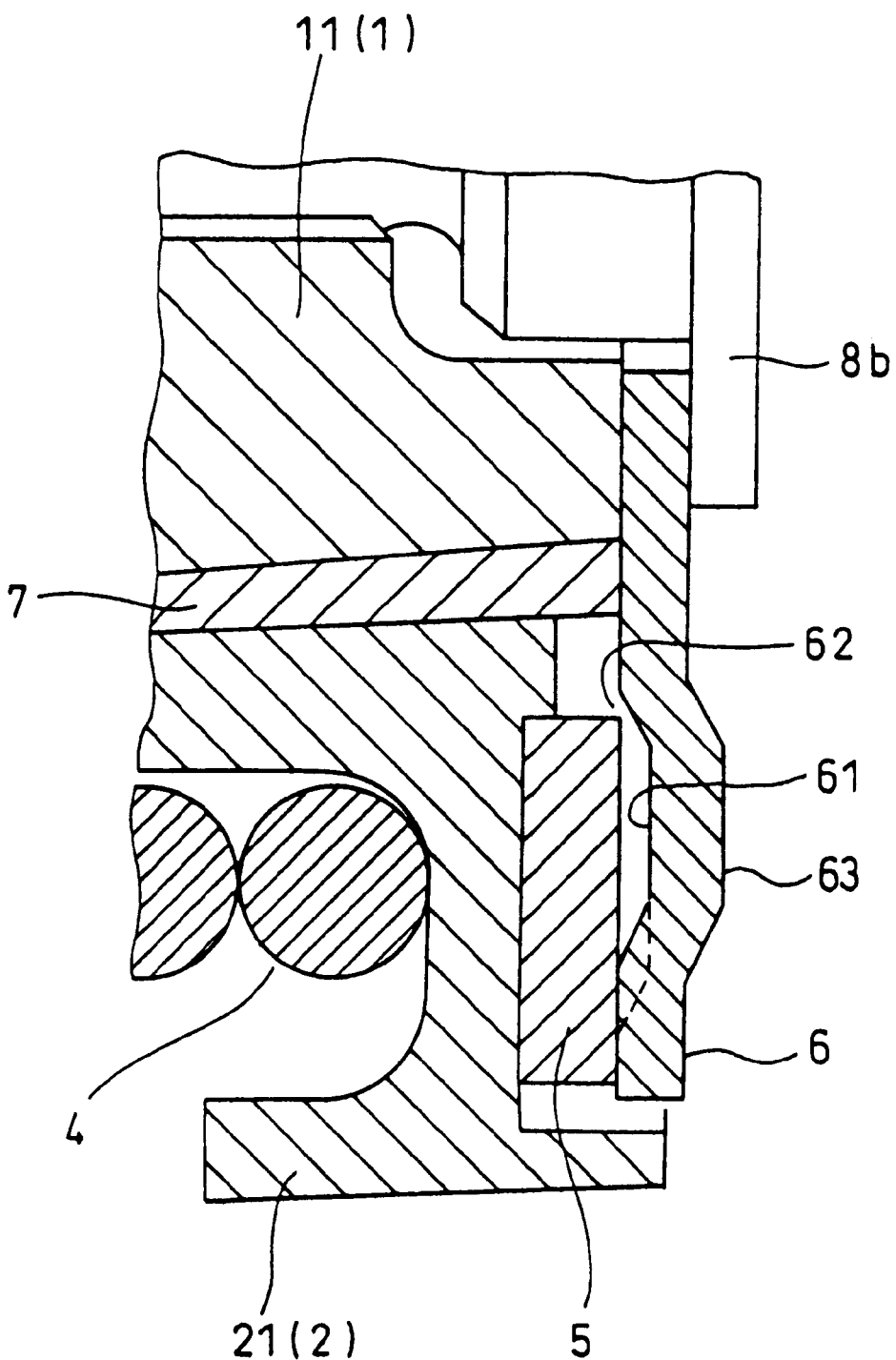
FIG. 3 is an enlarged view of major parts of FIG. 2.

In a first embodiment, the friction pressing plate 6 has concave portions 61 serving as wearing particles collecting portion, spaced circumferentially on an inner face thereof in the axial direction, which contacts the friction plate 5. This concave portion 61 is capable of collecting wearing particles generated from the friction plate 5. Each of the plural concave portions 61 is a belt-like groove stretching along the diameter. As shown in FIG. 3, an inside end in the diameter direction of the concave portion 61 is formed so as to extend more inward in the diameter direction than an inside end of an inner periphery of the friction plate 5, so that the inside end in the diameter direction of the concave portion 61 has an opening 62 serving as a wearing particles discharging portion which is open outside and discharges wearing particles to outside. The concave portion 61 is formed at the same time when the friction pressing plate 6 is formed by pressing. Thus, in the friction pressing plate 6, a portion corresponding to the concave portion 61 is partially swollen in the axial direction. This partially swollen portion 63 intensifies bending strength of the friction pressing plate 6 in the diameter direction and the circumferential direction.

Next, an operation of the auto tensioner having the above described structure will be described.

The tension of the belt 51 increases or decreases depending on a temperature change of the environment, a change of expansion of the belt with a passage of time or the like. If the tension of the belt 51 increases mildly, the arm 2 and further the tension pulley 3 incline to the right side of FIG. 1 against the twisting restoration force of the twisting coil spring 4. As a result, the tension of the belt 51 is kept constant. If the tension of the belt 51 decreases mildly, the arm 2 and further the tension pulley 3 incline to the left side of FIG. 1 by the twisting restoration force (urging force in the circumferential direction) of the twisting coil spring 4 so as to keep the tension of the belt 51 constant.

On the other hand, if a violent vibration or impact is applied from the belt 51 to the tension pulley 3, that vibration or impact is transmitted to the boss portion 21 of the arm 2 supporting the tension pulley 3. Because the boss portion 21 of the arm 2 is pressed against the friction plate 5 by the expansive restoration force (urging force in the axial direction) of the twisting coil spring 4, when the vibration or impact is transmitted to the boss portion 21 of the arm 2, a large friction resistance is generated among the boss portion 21 of the arm 2, the friction plate 5 and the friction pressing plate 6. As a result, the vibration and impact are absorbed and damped quickly. Therefore, the swing of the arm 2 is damped so that the position of the tension pulley 3 is substantially not changed. Consequently, the tension of the belt 51 is kept constant so as to prevent an unexpected slippage of the belt 51 from the tension pulley 3.

An abrasion of the friction plate 5 with a passage of time relating to the above described operation is unavoidable. Wearing particles are generated by the abrasion of the friction plate 5. This wearing particles are collected quickly in the plurality of the concave portions 61 in the friction pressing plate 6 equally along the circumference, and then discharged to outside from the opening 62 of the concave portion 61. Because in the first embodiment, the plurality of the concave portions 61 are provided in the circumferential direction and they are belt-like grooves along the diameter direction, they are capable of gathering wearing particles from a wide range through the swing operation of the arm 2 and discharging the wearing particles quickly. Because the wearing particles of the friction plate 5 are discharged from a gap between the friction plate 5 and friction pressing plate 6, the wear resistance of the friction plate 5 is hard to change thereby making it possible to suppress a reduction of the damping function for the vibration and impact.

In case when the tension pulley 3 is disposed at an offset position relative to the fixing shaft 1 like the auto tensioner 50 shown in FIG. 1, a load applied from the belt 51 to the tension pulley 3 acts as moment M inclining the tension pulley 3 along a plane in the offset direction. By this moment M, a large load is applied from the boss portion 21 of the arm 2 to the friction plate 5. Therefore, the abrasion of the friction plate 5 of the auto tensioner 50 having the offset disposing structure described above, is likely to be slightly larger than that of an auto tensioner not having the offset disposing structure. However, because in the first embodiment, the wearing particles of the friction plate 5 are discharged quickly, the auto tensioner 50 having such an offset disposing structure is particularly effective.

The present invention is not restricted to the first embodiment, but various applications and modifications can be considered.

Figure 5:
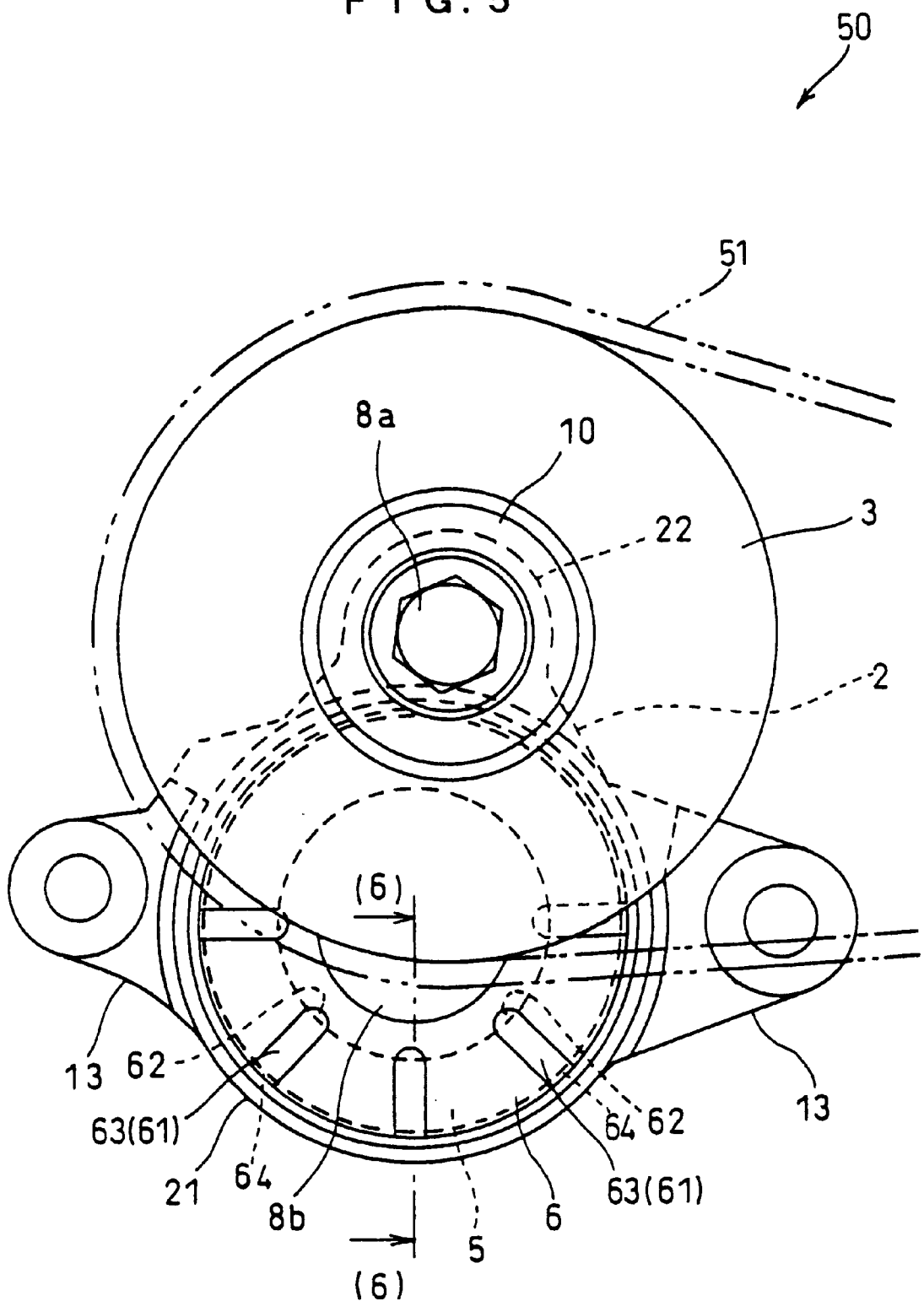
FIG. 5 is a plan view of an auto tensioner according to a second preferred embodiment of the present invention.
Figure 6:
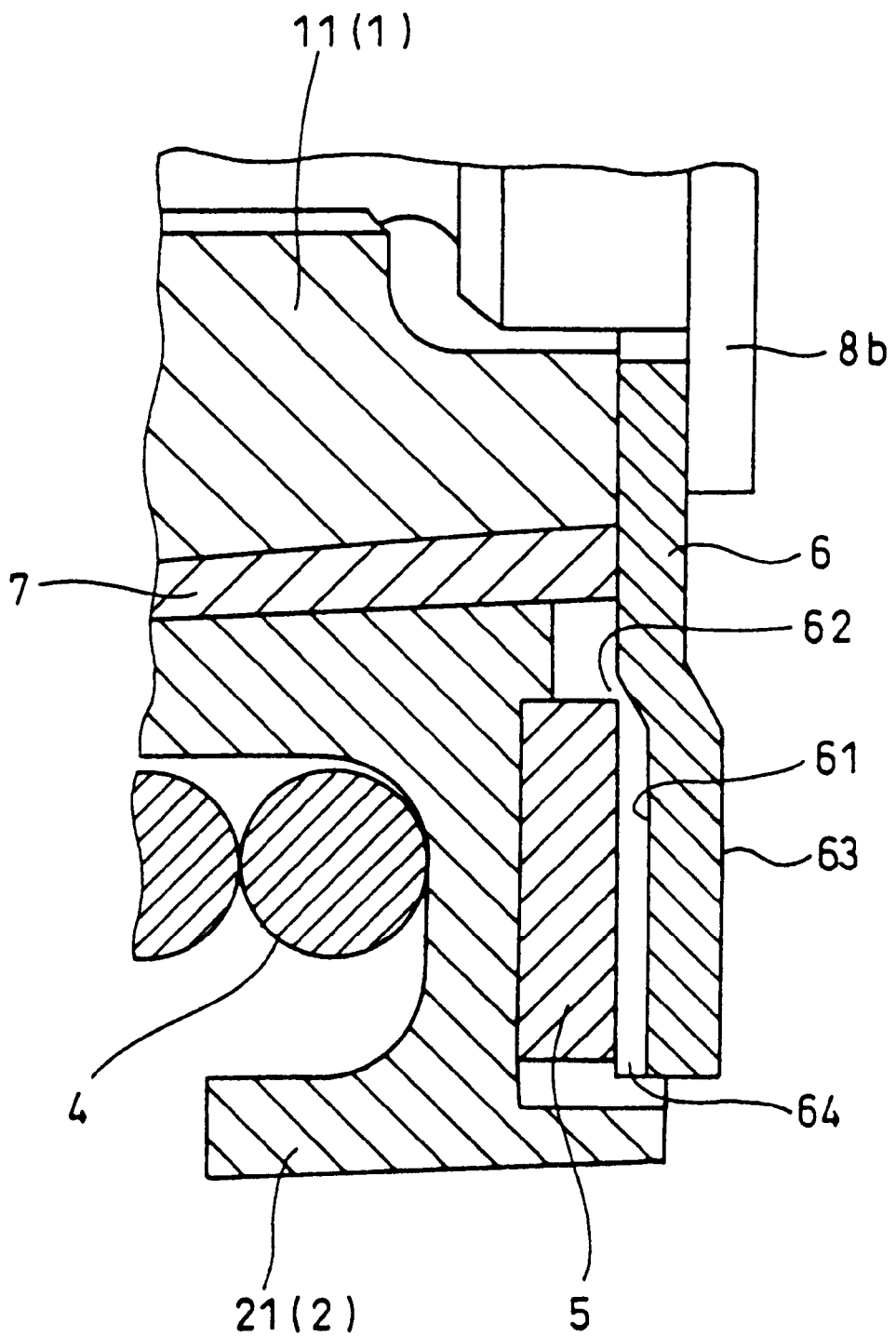
FIG. 6 is an enlarged sectional view taken along the line (6)—(6) of FIG. 5.

The auto tensioner 50 according to a second preferred embodiment of the present invention will be described with reference to FIGS. 5 and 6. In this second embodiment, the outside end in the diameter direction of the concave portion 61 described in the first embodiment is extended outward in the diameter direction beyond an outer periphery of the friction plate 5 such that an opening 64 which is open to outside is provided at an outside end of the concave portion 61 in the diameter direction. In this case, wearing particles collected in the concave portion 61 are discharged effectively through the opening 62 located inside in the diameter direction and the opening 64 located outside in the diameter direction so as to prevent the wearing particles from returning to the friction plate 5.

Figure 8:
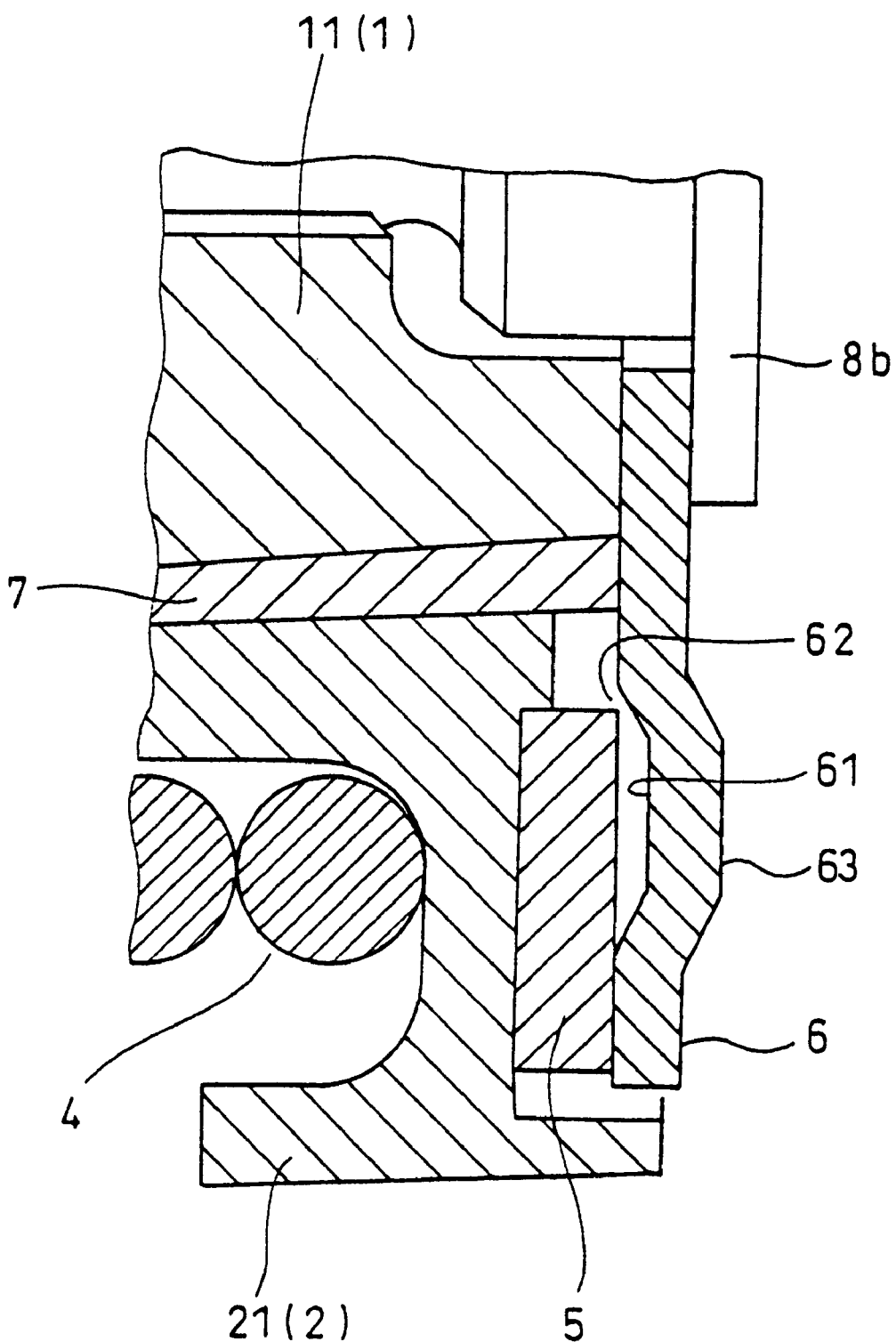
FIG. 8 is an enlarged sectional view taken along the line (8)—(8) of FIG. 7.

The auto tensioner 50 according to a third preferred embodiment of the present invention is shown in FIGS. 7 and 8. In this third embodiment, the concave portion 61 of the first embodiment is inclined at about 30–40° with respect to the diameter direction. As for the inclination direction, the outside end in the diameter direction of the concave portion 61 is slid in the counterclockwise direction and set in the same direction as the twisting restoration force (urging force in the circumferential direction) of the twisting coil spring 4. In this case, the same wearing particles discharging effect as the first embodiment can be assured. Further, because if the tension of the belt 51 increases so that the arm 2 swings in the clockwise direction, the wearing particles inside the concave portion 61 can be taken to the opening 62 located inside in the diameter direction, thereby accelerating the discharge of the wearing particles.

Figure 9:
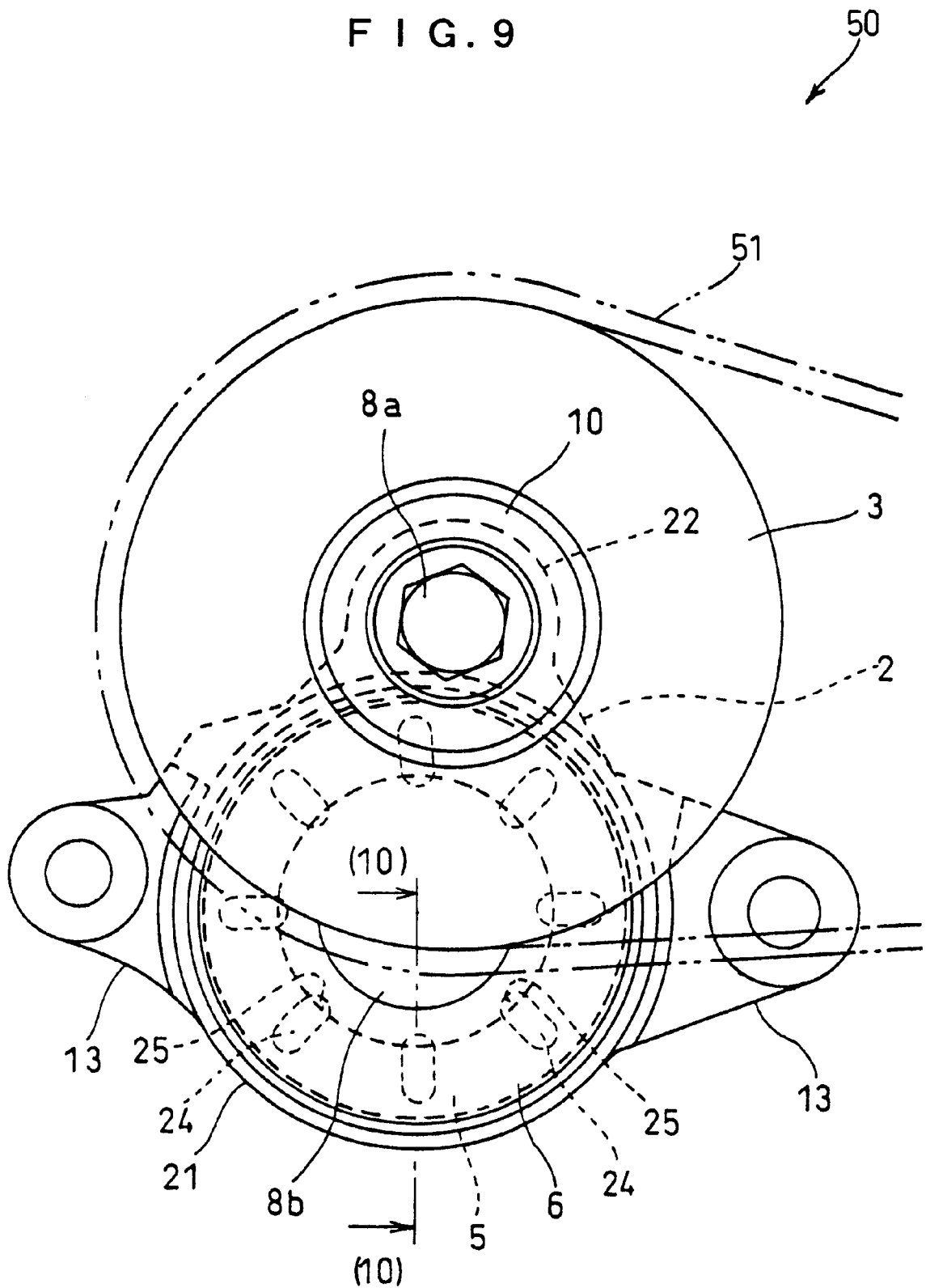
FIG. 9 is a plan view of an auto tensioner according to a fourth preferred embodiment of the present invention.
Figure 10:
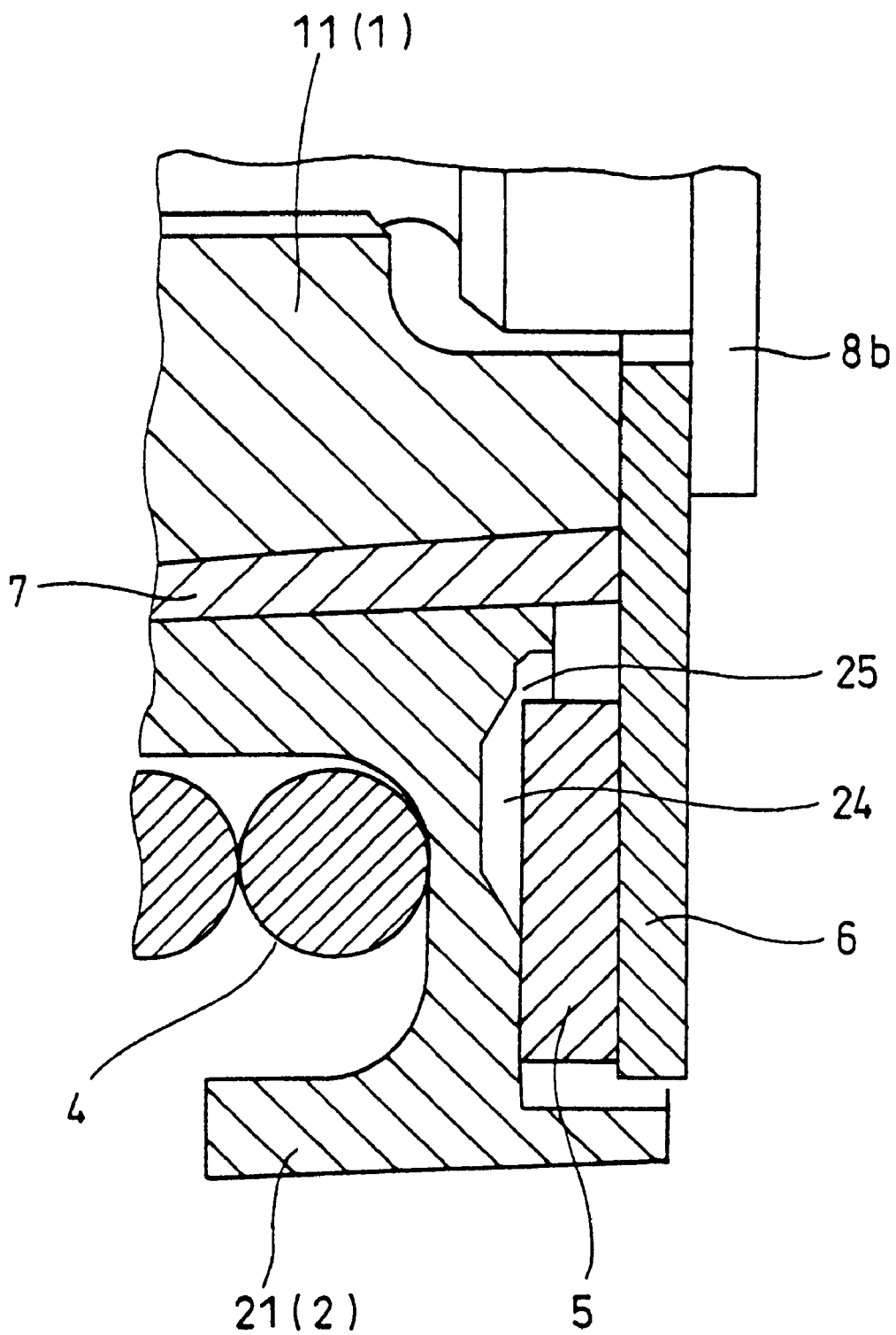
FIG. 10 is an enlarged sectional view taken along the line (10)—(10) of FIG. 9.

The auto tensioner 50 according to a fourth preferred embodiment of the present invention is shown in FIGS. 9 and 10. In this fourth embodiment, the same concave portion 24 as the first embodiment is formed on an end face (face which the friction plate 5 contacts) of the boss portion 21 of the arm 2 such that the wearing particles in the concave portion 24 can be discharged from the opening 25 located inside. Consequently, the same wearing particles discharging effect as the first embodiment can be ensured. The concave portion 24 of the fourth embodiment can be formed by transferring from a molding die at the same time when the arm 2 is formed of aluminum by die casting.

Figure 11:
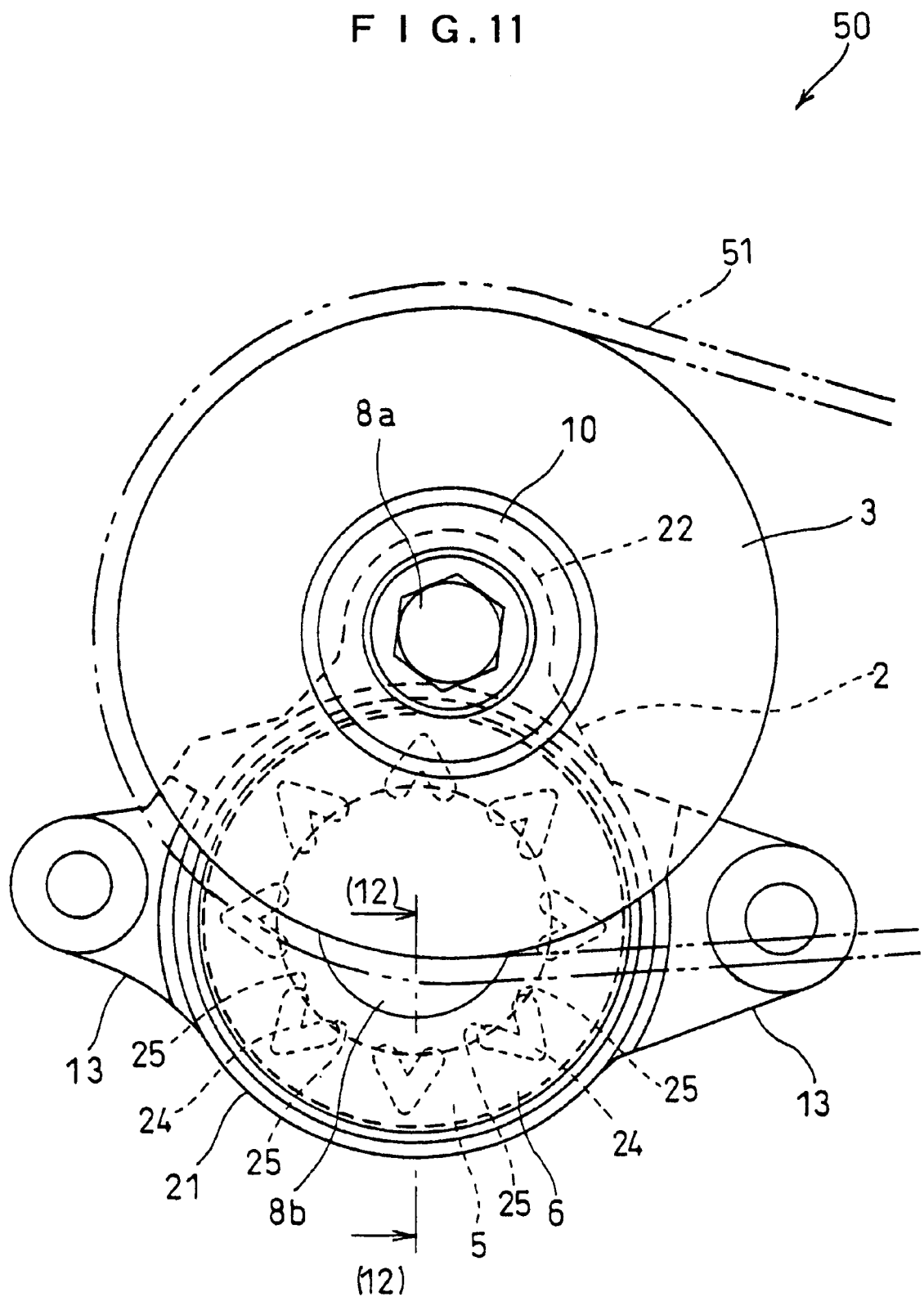
FIG. 11 is a plan view of an auto tensioner according to a fifth preferred embodiment of the present invention.
Figure 12:
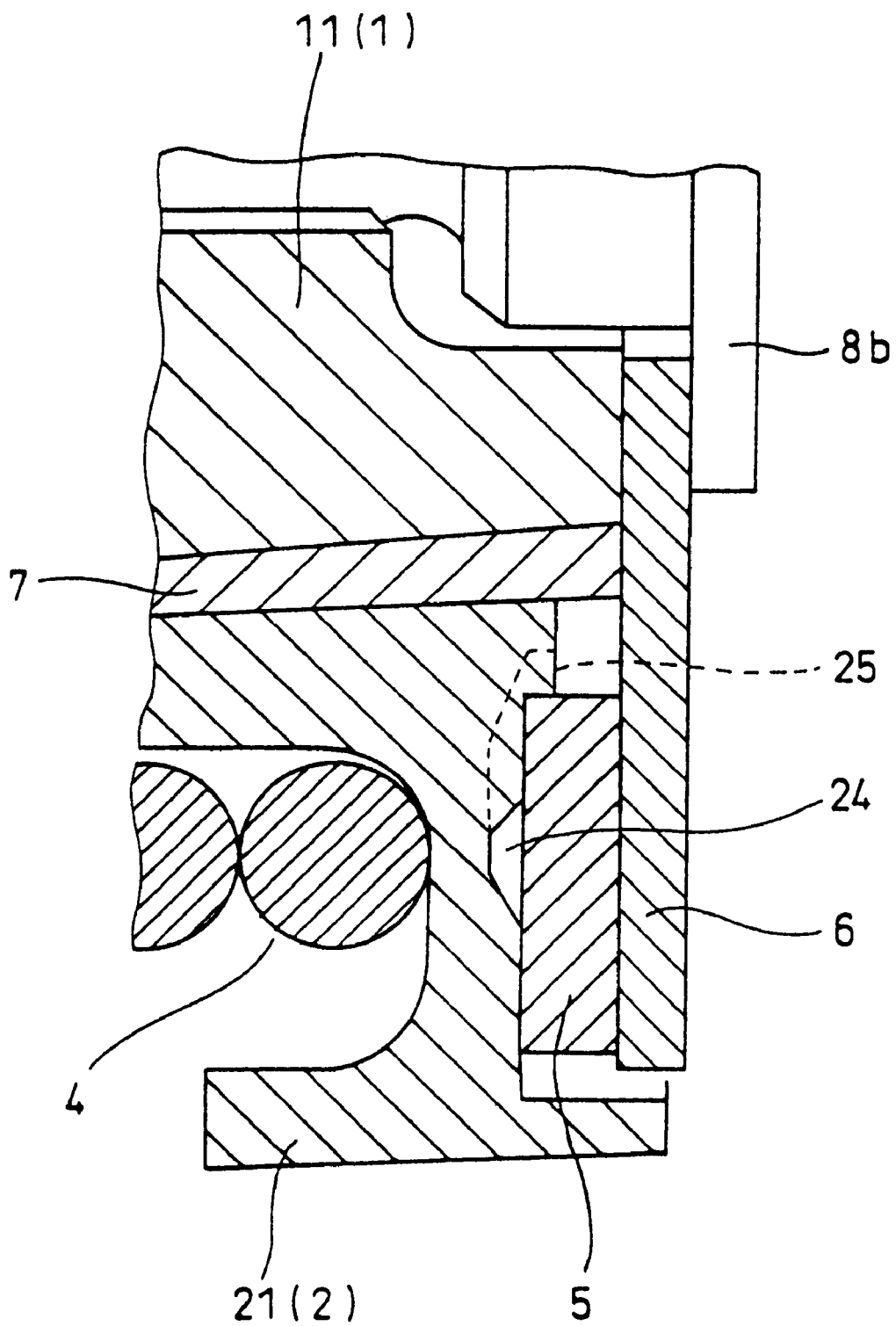
FIG. 12 is an enlarged sectional view taken along the line (12)—(12) of FIG. 11.

The auto tensioner 50 according to a fifth preferred embodiment of the present invention is shown in FIGS. 11 and 12. In this fifth embodiment, the shape of the concave portion 24 is different from that of the concave portion 24 of the fourth embodiment. That is, in this fifth embodiment, the V-shaped concave portion 24 is formed in an end face of the boss portion 21 of the arm 2. Both ends of the V letter of the concave portion 24 or inside ends in the diameter direction are extended more inward in the diameter direction than the inside ends in the diameter direction of the friction plate 5 so that an opening 25 is provided at the inside end in the diameter direction. Because the concave portion 24 is formed in the boss portion 21 of the arm 2 by die casting, even a complicated shape of the concave portion 24 can be formed easily. Further, in the fifth embodiment, with a motion of the arm 2 in the clockwise direction or counterclockwise direction, the wearing particles collected in the concave portion 24 are moved toward the opening 25, thereby accelerating the discharge of the wearing particles. Although in the above first–fifth embodiments, the concave portion 24 or 61 is formed on only one friction mating member (6 or 21) relative to the friction plate 5, it is permissible to dispose the concave portions 24, 61 on both the friction mating members (6 and 21) relative to the friction plate 5. In this case, the shapes of the concave portions formed on both the friction mating members relative to the friction plate 5 may be the same or it is permissible to combine any different shapes of the first to fifth embodiments.

Although the concave portions 24, 61 having various shapes are shown in the first to fifth embodiments, the shape and quantity thereof are not restricted. For example, the concave portion may be formed in a X-shape or Y-shape. Further, the concave portions 24, 61 of the above second and fourth embodiments may be inclined with respect to the diameter direction like the above third embodiment. The concave portions 24, 61 according to the third–fifth embodiments may be provided with an opening outside in the diameter direction of the friction plate 5 like the first embodiment. The concave portion 61 of the first–third embodiments may be formed in the V-shape like the fifth embodiment. In the concave portion 61 of the second embodiment, it is permissible to omit the opening 62 inside in the diameter direction.

Although in the first–fifth embodiments, the concave portions 24, 61 are spaced along the circumference, it is permissible to dispose them at an unequal space along the circumference.

Although in the auto tensioner 50 according to the first–fifth embodiments, the tension pulley 3 is disposed at an offset position relative to the fixing shaft 1, the present invention can be applied to an auto tensioner not having the offset disposing structure.

Figure 13:
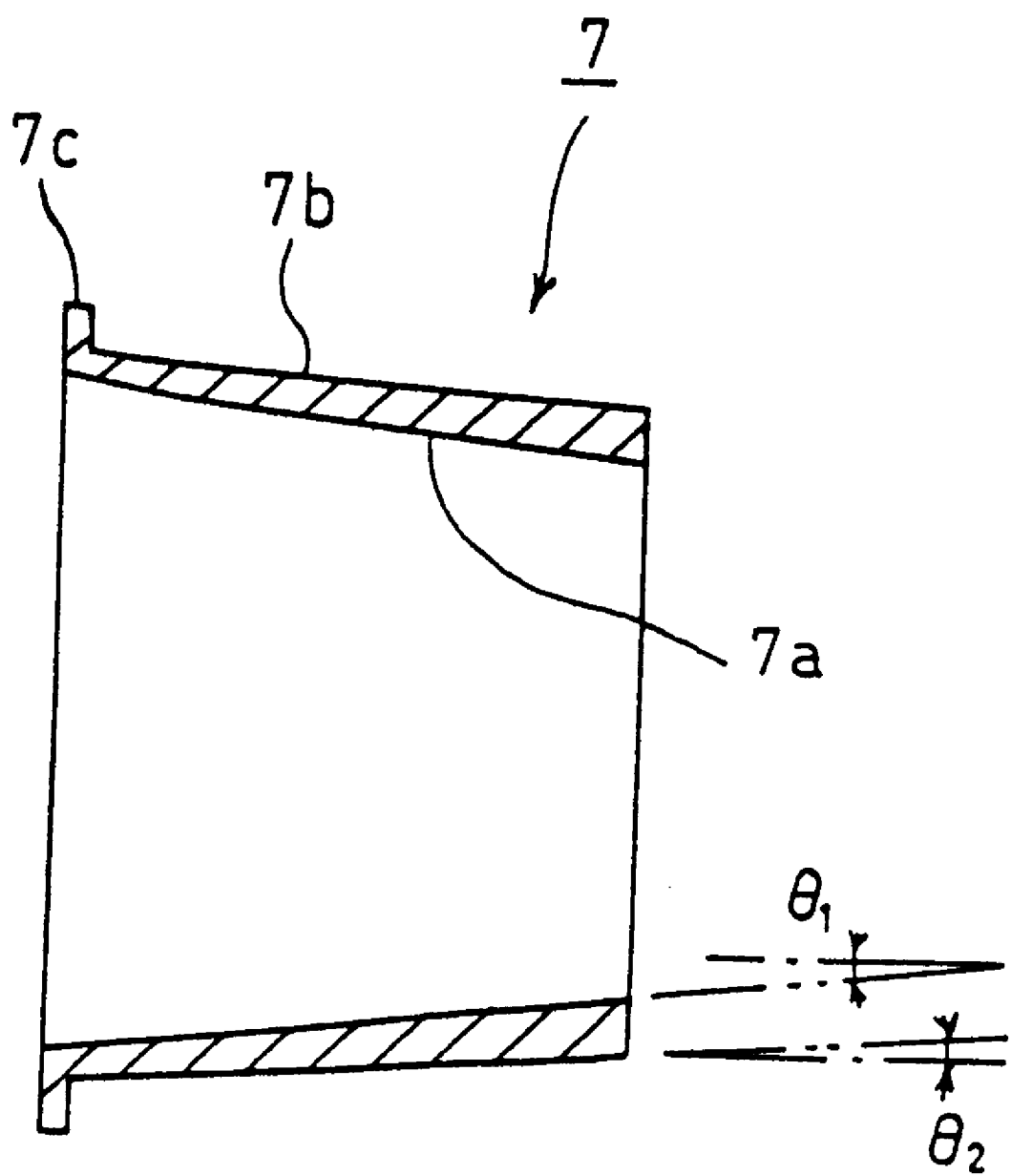
FIG. 13 is an enlarged sectional view of a bushing according to the respective embodiments.

In the auto tensioner 50 according to the first–fifth embodiments, the bushing 7 is interposed between an outer surface of the frustum shaped end half portion 11a of the arm supporting portion 11 of the fixing shaft 1 and an inner surface of the boss portion 21 of the arm 2. As shown by an enlargement of FIG. 13, this bushing 7 is so constructed that its thickness gradually increases from the proximal end of the arm supporting portion 11 to an distal end thereof. In detail, the inner surface 7a and outer surface 7b of the bushing 7 are formed in a frustum shape and an inclination angle $\theta_2$ of the outer surface 7b with respect to the axial direction is smaller than an inclination angle $\theta_1$ ($\theta_2<\theta_1$) of the inner surface 7a of the busing 7. As a result of this relation of the inclination angle, the thickness of the bushing 7 gradually increases from the proximal end of the arm supporting portion 11 to the distal end thereof. Consequently, the inner surface 7a of the bushing 7 firmly contacts an outer surface of the frustum shaped end half portion 11a of the arm supporting portion 11 and an inner surface of the boss portion 21 of the arm 2 firmly contacts the outer surface 7b of the bushing 7. The bushing 7 has a flange 7c which is disposed at a large-diameter end portion and extends outward in the diameter direction. The bushing 7 is composed of polyamide synthetic resin (e.g., polyamide 46 (product name)).

If the fixing shaft 1 is produced by die-casting of aluminum, the outer surface of a portion which is the arm supporting portion 11 of the fixing shaft 1 and supports the boss portion 21 of the arm 2 is often formed in a frustum shape corresponding to a draft angle of a molding die.

However, because the inner surface 7a of the bushing 7 is formed in the shape of a frustum in which the diameter thereof decreases as the thickness of the bushing 7 increases, the inner surface 7a can be fit to the shape of the frustum of the arm supporting portion 11. Therefore, the installation of the bushing 7 to the arm supporting portion 11 of the fixing shaft 1 is facilitated.

Figure 14:
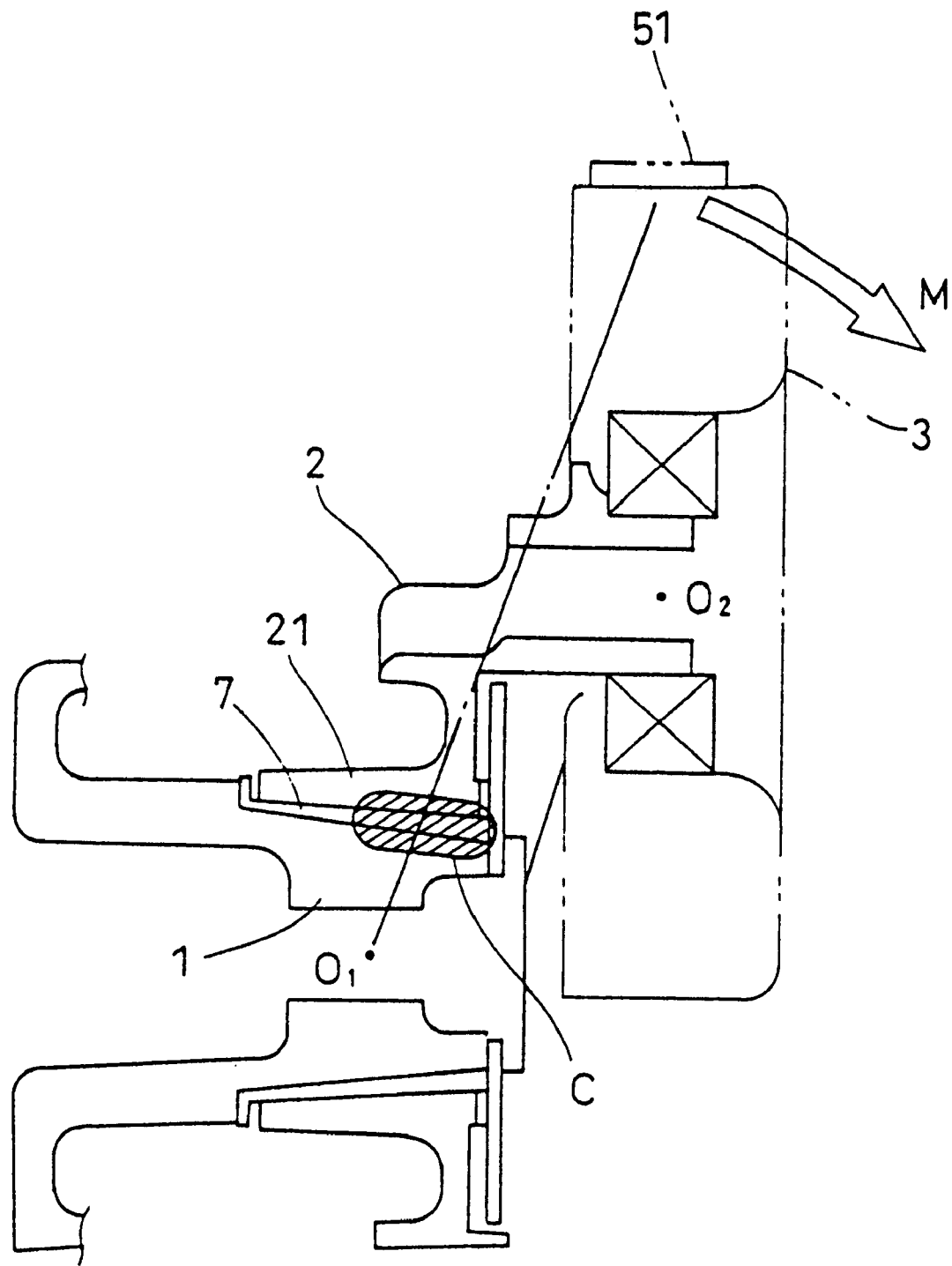
FIG. 14 is an explanatory view for explaining a function for suppressing crack and fracture of the bushing irrespective of a large load generated by a moment in a bushing structure of FIG. 13.

In the auto tensioner 50, the tension pulley 3 is disposed at a position extruding forward of the end of the fixing shaft 1. That is, with respect to the center $O_1$ in the diameter direction of the journaling portion of the arm 2 on the fixing shaft 1, the center $O_2$ in the diameter direction of the journaling portion of the tension pulley 3 on the arm 2 is offset. Therefore, a load applied from the belt 51 to the tension pulley 3 acts as a moment M inclining the tension pulley 3 along a plane in the offset direction. FIG. 14 shows a schematic view of this condition. Due to this moment M, a large load is applied from the boss portion 21 of the arm 2 to the bushing 7 in a range C indicated by hatching. This load increases as it goes to the end of the bushing 7.

In this case, because the bushing 7 is so constructed that the thickness thereof increases gradually from the proximal end of the arm supporting portion 11 to the distal end, the bushing 7 can be supplied with a sufficient load resistance and wear resistance against the large load generated by the moment M. This suppresses a generation of eccentric abrasion, crack or fracture in the bushing 7. Because the generation of eccentric abrasion in the bushing 7 is suppressed, the tension pulley 3 is prevented from inclining, so that the belt 51 applied around the tension pulley 3 is prevented from slipping out of the tension pulley 3.

Further, irregular swing of the tension pulley 3 which may be generated by the crack or fracture of the bushing is eliminated, so that a proper function of the auto tensioner (absorption of tension/looseness of the belt and damping of vibration and impact) is sufficiently exerted.

Figure 15:
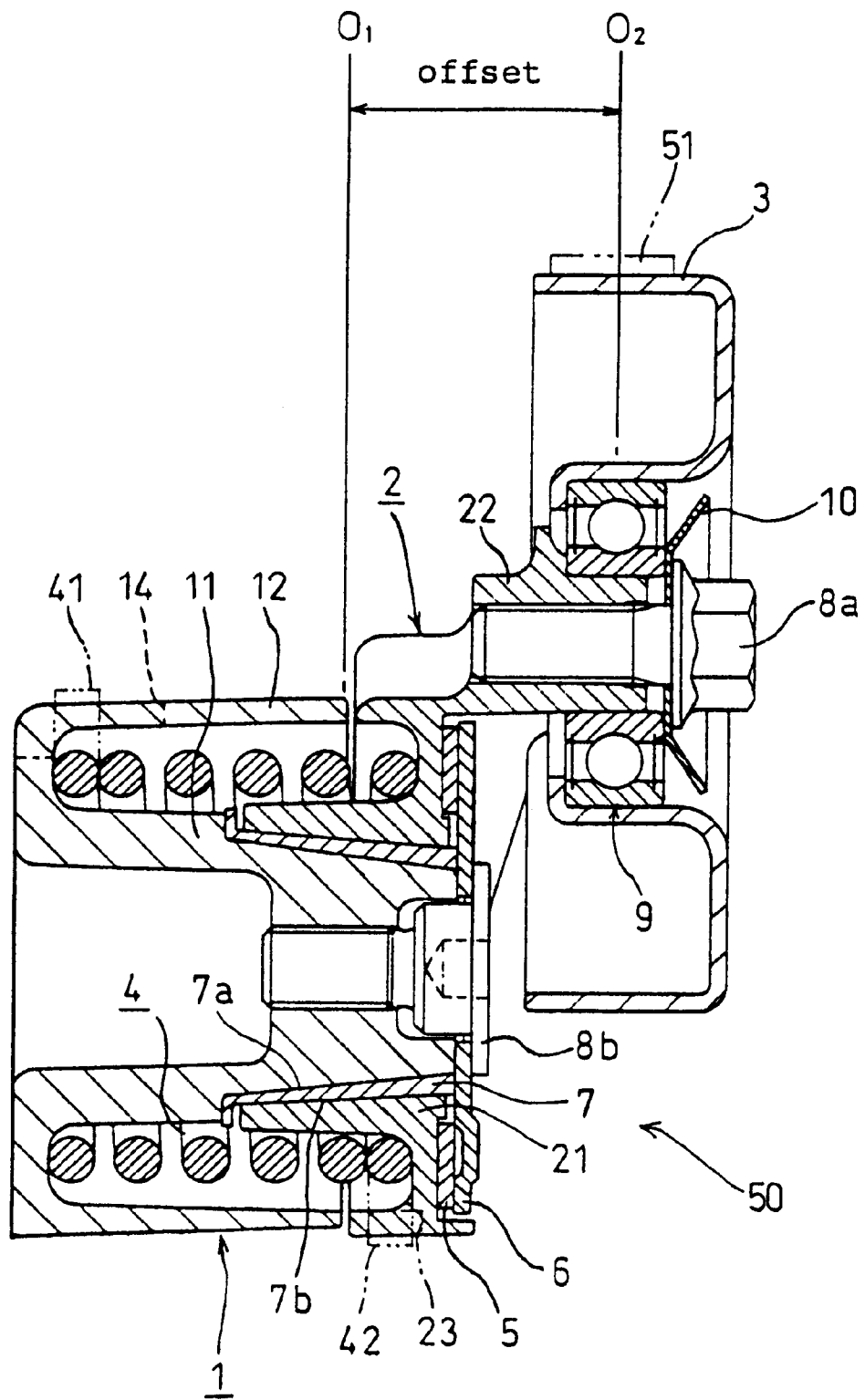
FIG. 15 is a sectional view of an auto tensioner according to a sixth preferred embodiment of the present invention.

As described above, the inner surface 7a of the bushing 7 is formed in a frustum shape corresponding to the draft angle of the frustum portion of the arm supporting portion 11 of the fixing shaft 1 and the outer surface 7b is also formed in a frustum shape, as shown in FIG. 15 as a sixth preferred embodiment, it is permissible that only the inner surface 7a is formed in the frustum shape while the outer surface 7b is formed in a cylindrical shape. In this case also, the thickness of the bushing 7 increases gradually from the proximal end of the arm supporting portion 11 to the distal end so that the bushing 7 is supplied with a sufficient load resistance and wear resistance against a large load generated by the moment M, thereby preventing a generation of the eccentric abrasion, crack or fracture in the bushing 7.

Further, it is permissible that the inner surface 7a of the bushing 7 is formed in a cylindrical shape while the outer surface 7b is formed in a frustum shape having a draft angle opposite to the frustum portion of the arm supporting portion 11 so that the thickness of the bushing 7 increases as it goes to the distal end.

Further, the material of the bushing 7 may be other series synthetic resin or metal as long as a desired sliding characteristic, load resistance and wear resistance are possessed. In case of the metal, sintered metal impregnated with lubricant is preferred.

While there has been described what is at present considered to be preferred embodiments of the present invention, it will be understood that various modifications may be made therein, and it is intended to cover in the appended claims all such modifications as fall within the true spirit and scope of the present invention.

What is claimed is:

1. An auto tensioner comprising:

a fixing shaft having an arm supporting portion;

an arm supported around said arm supporting portion of said fixing shaft so as to be swingable;

a tension pulley supported rotatably at a free end of said arm;

an opposing member disposed so as to oppose said arm and blocked from rotating relative to said arm supporting portion;

a friction plate disposed between said arm and said opposing member so as to supply said arm with a swing resistance due to a friction resistance generated by a contact thereof with said opposing member; and a pressing member for pressing said arm against said friction plate so as to make said friction plate in contact with said opposing member, wherein at least one of said arm supporting portion and said opposing member has a wearing particles collecting portion for collecting wearing particles generated in a plane contacting said friction plate because of a friction with said friction plate, wherein said wearing particles collecting portion comprises a concave portion formed in a plane in which at least one of said arm supporting portion and said opposing member is in contact with said friction plate.

2. An auto tensioner as claimed in claim 1 wherein said opposing member is a friction pressing plate for pressing said friction plate against said arm.

3. An auto tensioner as claimed in claim 1 wherein said pressing member is a twisting coil spring for pressing said arm against said friction plate and urging said arm in a direction of a rotation thereof.

4. An auto tensioner as claimed in claim 1 wherein said arm supporting portion has a central axis and wherein a plurality of said wearing particles collecting portions are spaced along the circumference of a circle centered on said central axis of said arm supporting portion.

5. An auto tensioner as claimed in claim 1 further comprising a wearing particles discharging portion for discharging wearing particles collected in said wearing particles collecting portion to outside.

6. An auto tensioner as claimed in claim 1 further comprising a wearing particles discharging portion for discharging wearing particles collected in said wearing particles collecting portion to outside, wherein said wearing particles discharging portion is an opening formed by extending an inner end in the diameter direction of said concave portion inward in the diameter direction beyond an inner end in the diameter direction of said friction plate.

7. An auto tensioner as claimed in claim 1 wherein the wearing particles collecting portion is composed of a belt-like groove formed in the diameter direction.

8. An auto tensioner as claimed in claim 1 wherein said wearing particles collecting portion is composed of a belt-like groove inclined relative to the diameter direction.

9. An auto tensioner as claimed in claim 1 wherein said wearing particles collecting portion is composed of a V-shaped groove.

10. An auto tensioner as claimed in claim 1 further comprising a bushing interposed between an outer surface of said arm supporting portion of said fixing shaft and an inner surface of said arm mounted on said arm supporting portion, wherein with respect to a center in the axial direction of the arm supporting portion of said fixing shaft, a center in the axial direction of a pulley supporting portion which is a free end of said arm is offset and said tension pulley is rotatably supported by the pulley supporting portion of said arm and said bushing has a thickness which increases gradually from a proximal end of said arm supporting portion to a distal end thereof.

11. An auto tensioner as claimed in claim 10 wherein said bushing is so constructed that an inclination angle of an outer surface thereof relative to the axial direction is smaller than the inclination angle of an inner surface thereof so as to have said shape of thickness.

* * * * *